United States Patent

Ferris et al.

[11] Patent Number: 5,878,158
[45] Date of Patent: *Mar. 2, 1999

[54] RIDGE-VALLEY MINUTIA ASSOCIATOR FOR FINGERPRINTS

[76] Inventors: Stephen G. Ferris, 80 Campbell Ave., Troy, N.Y. 12180; Terry K. Lindh, 428 E. Shore Rd., Delanson, N.Y. 12053; Robert L. Powers, 37 Mansion Dr., Topsfield, Mass. 01983

[*] Notice: The terminal 22 months of this patent has been disclaimed.

[21] Appl. No.: 437,982

[22] Filed: May 10, 1995

[51] Int. Cl.$^6$ ........................................... G06K 9/00
[52] U.S. Cl. ............................................. 382/125
[58] Field of Search ................................... 382/124, 125, 382/199, 204, 258, 259; 356/71

[56] References Cited

U.S. PATENT DOCUMENTS

| | | | |
|---|---|---|---|
| 3,859,633 | 1/1975 | Ho et al. | 340/146.3 E |
| 3,893,080 | 7/1975 | Ho et al. | 340/146.3 E |
| 4,135,147 | 1/1979 | Riganati et al. | 340/146.3 E |
| 4,208,651 | 6/1980 | McMahon | 340/146.3 E |
| 4,227,805 | 10/1980 | Schiller | 356/71 |
| 4,525,859 | 7/1985 | Bowles et al. | 382/5 |
| 4,641,350 | 2/1987 | Bunn | 382/4 |
| 4,646,352 | 2/1987 | Asai et al. | 382/5 |
| 4,752,966 | 6/1988 | Schiller | 382/5 |
| 5,420,937 | 5/1995 | Davis | 382/125 |

*Primary Examiner*—Leo Boudreau
*Assistant Examiner*—Andrew W. Johns

[57] ABSTRACT

A fingerprint image is processed from its original gray tone image to a binary (black and white) image. The "ridge" skeletal image is formed of the black portions of the binary image, being derived from the ridges of the fingerprint. A separate "valley" skeletal image is formed of the white portions of the binary image, being derived from the valleys interposed between the ridges. Ridge minutiae are detected from the ridge skeletal image and processed to eliminate apparently inappropriate minutiae. Separately, valley minutiae are detected from the valley skeletal image and processed to eliminate apparently inappropriate minutia. Then the ridge and valley minutiae are processed together. Only those ridge minutiae that can be correlated locally with individual valley minutiae survive to be passed to a fingerprint matcher.

2 Claims, 3 Drawing Sheets

 
Portion of Binary image 8
Portion of Inverse binary image 12
FIG. 2a
FIG. 2b

RIDGE-VALLEY MINUTIA ASSOCIATOR FOR FINGERPRINTS

BACKGROUND OF THE INVENTION

1. Field of the Invention

This invention generally relates to the methods and apparatus for determining the true minutia within a fingerprint for the purpose of the subsequent matching or comparing fingerprint minutia data sets, and more specifically relates to a minutia detector which determines a minutiae list from the association of a ridge skeletal image and a valley skeletal image and their independently determined minutiae.

2. Description of the Related Art

The appearance of fingerprints is well known. Closely spaced, generally parallel ridges of friction skin appear black on an inked fingerprint (or "print"). The ridges exhibit usually a generally circular flow around the center, or "core" of the print. Asai (U.S. Pat. No. 4,646,352, col.5, line 68) observes that, in general, one can tell where is the tip of the finger by looking at the ridge flow. People have a maximum ridge density of about 32 ridges/cm (Bunn, 4,641,350 column 4, line 44).

At specific points a ridge may terminate at a "ridge end" or may divide into two ridges at a "bifurcation". Other morphological events, such as "bridges", "islands" and "trifurcations" (McMahon, 4,208,651 col. 3, line 20; Riganati et al., 4,135,147 col. 4, line 67; Schiller, 4,752,966 col. 1, line 36), are known as well. These points are known as minutiae (singular, "minutia" ), and they number typically 50–200 on people's fingers (Riganati et al., 4,135,147 col. 5, line 36). Their disposition across the fingerprint, unique to the individual and to the finger, form a basis for using fingerprints to identify people.

In order to compare fingerprints, an automated system may implement typically, and very broadly speaking, processing in four steps on a digitized grey-level image of each given print. These are:

i) Preliminary Image Processing. This is a sequence of directional smoothing, filtration and contrast enhancement. Processing will include establishing a "direction map" of the apparent ridge flow. The direction map is an image whose values are circular, corresponding to traversing $\pi$ radians. Processing may include detection of areas which are blurred or unclear. The resultant grey-level image presumably has smaller local variations in image intensity and is clearer than the original.

ii) Binarization. Roughly, this turns all dark pixels black and all light pixels white. The process will usually take into account a direction map, similar to that used in Preliminary Image Processing, but applied now to the image input to this second step. The process may fit a directional filter matched to the average local ridge and valley structure. Ideally the resultant binary image will show thick, smooth black ridges.

iii) Skeletonization. The thick black ridges in the binary image are "thinned" down to one-pixel thickness. The result should be a skeletal image where long thin ridges are interrupted by locations which are obvious ridge ends or bifurcations.

iv) Minutia Identification. Given the skeletal image, all candidate ridge ends and bifurcations are identified. Repairs are made to the skeletal image where there are obvious problems with detail, and corresponding updates are performed on the corpus of candidate minutiae.

The last step, Minutia Identification, typically cannot resolve all problems with detail in the skeletal image. Hence, at the end of the processing outlined above, the resultant corpus of candidate minutiae usually contains "false" minutiae, ones that properly should not be used to match the print against others. These false minutiae are a serious problem for a fingerprint matcher that consumes minutiae, slowing down its processing while providing greater opportunity for false matching between prints. A matcher that depends on local relationships among minutiae has the further problem that these false minutiae will interrupt the true relationships. For instance, if the matcher needs the closest minutia to another, an interposed false minutia will mask the truly closest one.

Accordingly, it is an object of the present invention to reduce the number of these false minutiae.

False minutiae occur in areas of the skeletal image where the ridge morphology has been interpreted incorrectly. Many times a false "bridge" will connect two otherwise well behaved neighboring ridges. This failure derives often from a very dark local area of the acquired grey-level image, wherein the Binarizer does not interpose white valley pixels through the area. The Skeletonizer then, not having a continuous thin row of white pixels from which to start eroding the black, renders an interpretation of the local area as "H" instead of as "II".

Other failures, where the ridge structure has been thinned inappropriately, are often easy to see. In extremely untoward cases areas with poor morphology may look more like a "honeycomb" than like parallel ridges. Such problems can arise from several causes, including:

i) The direction maps of either Preliminary Image Processing or Binarization may fail to characterize properly the ridge flow, particularly in areas with high ridge curvature.

ii) Blur detection in Preliminary Image Processing may fail, leading to a failure properly to mask scarred or otherwise truly unclear areas of the print.

iii) The Binarizer may fail to characterize the local ridge and valley profile, especially when ridges are too thick near the crease of the first finger joint.

iv) Given the exigencies of connectivity of black areas in the binary image, some small local areas may reveal various anomalies in the Skeletonizer. These anomalies may tend to be subtle. Sometimes their interpretation of connectivity in places, while not wrong, may be unexpected.

Minutia Identification performs most of the requisite repairs. Each such repair involves a reduction in the number of apparent minutiae that reside on the skeletal image. Among such repairs are: repairing small breaks in ridges, eliminating small islands and ridge spurs, and eliminating small apparent "bubbles" in ridges. Many of these examples may derive from true conditions on the finger itself. Ridge spurs and other noted conditions are certainly known. Apparent bubbles often represent pores in the skin. But these true details cannot be distinguished easily from false details with similar skeletal morphology. In particular, apparent bubbles occur where the ridge thickness is much greater than average. Each such repair involves a reduction in the number of apparent minutiae that reside on the skeletal image.

Minutia Identification cannot resolve all problems with detail in the skeletal image. There is a limit to what can be done to repair a ridge skeleton without then beginning to destroy the structure about true minutiae. We would like another source of knowledge, in addition to the ridge skeleton itself. The natural dark-light symmetry of the fingerprint provides us additional information which can be used by the Minutia Detector.

For a normal, high-quality minutia to be derived from a clear ridge on the binary image, one would expect that the "inverse" part of the binary image about the ridge would be similarly clear. The white space interposed about the black ridges correspond to "valleys" between the ridges. A clear ridge end should be nestled in the "Y" of a "bifurcation" of the surrounding valley. Conversely, a clear ridge bifurcation should surround a valley "end". Hence, at least for minutiae limited to "endings" and "bifurcations", ridges and valleys "mirror" each other. Schiller (4,227,805 col. 1, line 10 and 4,752,966 col. 1, line 20) refers to minutiae of both ridges and valleys. Bowles et al. (4,525,859 col. 2, line 27) note that the terminations of valleys are ridge bifurcations. Also Davis (5,420,937) makes similar observations (see below).

It is in fact true, minutiae can be determined by either the processing of a ridge image or the processing of a valley image. It is also true that certain false minutiae can be detected using specific editing criteria embedded within either process. Either process used individually, however, retains a number of false minutiae which may be undesirable in a subsequent match process.

With the above background in mind, the inventors have recognized a need to provide a minutia detector that is more accurate in the elimination of false minutiae.

SUMMARY OF THE INVENTION

According to the present invention, a minutia detector uses both ridge and valley skeletons to determine a resulting minutia list. This list is determined from the association of a ridge skeletal image minutia set and a valley skeletal image minutia set.

Ridge minutiae that are clear and identified correctly should reside in an area of the print where the corresponding "valley minutia" can be identified as well. In order to identify valley minutiae, the present invention will process the inverse of the binary image to obtain a "valley skeletal image". Then "minutia detection" will be performed on this image. Only those ridge minutiae that can be tied to a unique local corresponding valley minutia will survive to be retained for use in matching.

The Skeletonization and Minutia Identifier consist of stages that may be thought of as closely tuned to their desired inputs and outputs. They are highly nonlinear and noninvertible. Hence, doing them both twice for different sets of data, even data that are strict black-white inverses of each other, represents a kind of "triangulation" on the true fingerprint structure. The present invention leverages the technology developed for use in processing ridges. The same Skeletonizer and Minutia Identifier are deployed on the valley binary images as well. The result is a more correct list of minutiae than that derived from either the ridge or valley binary images alone.

As a brief example, consider the case of the false bridge noted in the "Description of Related Art." The ridge skeleton has a local "H" where we should prefer that it look like "II". The crossbar of the "H" should be attached to the neighboring ridges by false bifurcations. Suppose we process the valley image in this region. We should get one of two cases:

i) The valley is interrupted by the crossbar of the "H". The valley skeleton has two opposing lines each terminating in an ending, one above the crossbar and one below. Minutia Identification will most likely connect these close valley endings. Then, when a correspondence is made between ridge and valley minutiae, the false ridge bifurcations are left with no valley ending partners. Hence the false ridge minutiae disappear from the list of minutiae to be passed to the matcher.

ii) The valley skeleton is for some reason not interrupted by the crossbar of the "H". The Skeletonizer could do this, especially if the original crossbar were very thin and oriented at plus or minus 45° in the frame of the image. Then, just as above, the false ridge bifurcations are left again with no valley ending partners.

In both cases we are left with the desired result. Insisting that the interposed valley skeleton validate the false minutiae on the crossbar is a reliable way of eliminating these minutiae.

Recently, Davis (5,420,937 col. 2, line 25 and col. 5,line 55) notes that ridges and valleys are "complementary" and goes on to assert that the valleys can be used to "corroborate" data from the ridges. Very briefly, Davis' patent shows a coupled pair of state machines designed to track along the borders of ridges. They maintain their relative positions on opposite sides of the ridge as they trace along together. When the trackers come together, with no further ridge between them, they have detected a ridge end. Detection of a bifurcation is of course more complex, but unfolds from the same class of mechanisms: when the trackers diverge they may have detected a bifurcation. By this invention Davis elegantly bypasses the usual requirement to skeletonize the binary image and to repair a skeletal image. In cases where one does skeletonize, however, the Ridge-Valley Minutia Associator may be used to advantage. In particular, for some embodiments of the present invention one needs the skeletal image in order to measure the apparent orientation of minutiae.

BRIEF DESCRIPTION OF THE DRAWINGS

The preferred exemplary embodiment of the present invention will hereinafter be described in conjunction with the appended drawings, where like designations denote like elements, and:

FIG. 2 illustrates a portion of a binary image and the same portion of the corresponding inverse binary image.

DETAILED DESCRIPTION OF A PREFERRED EXEMPLARY EMBODIMENT

Figure 1:
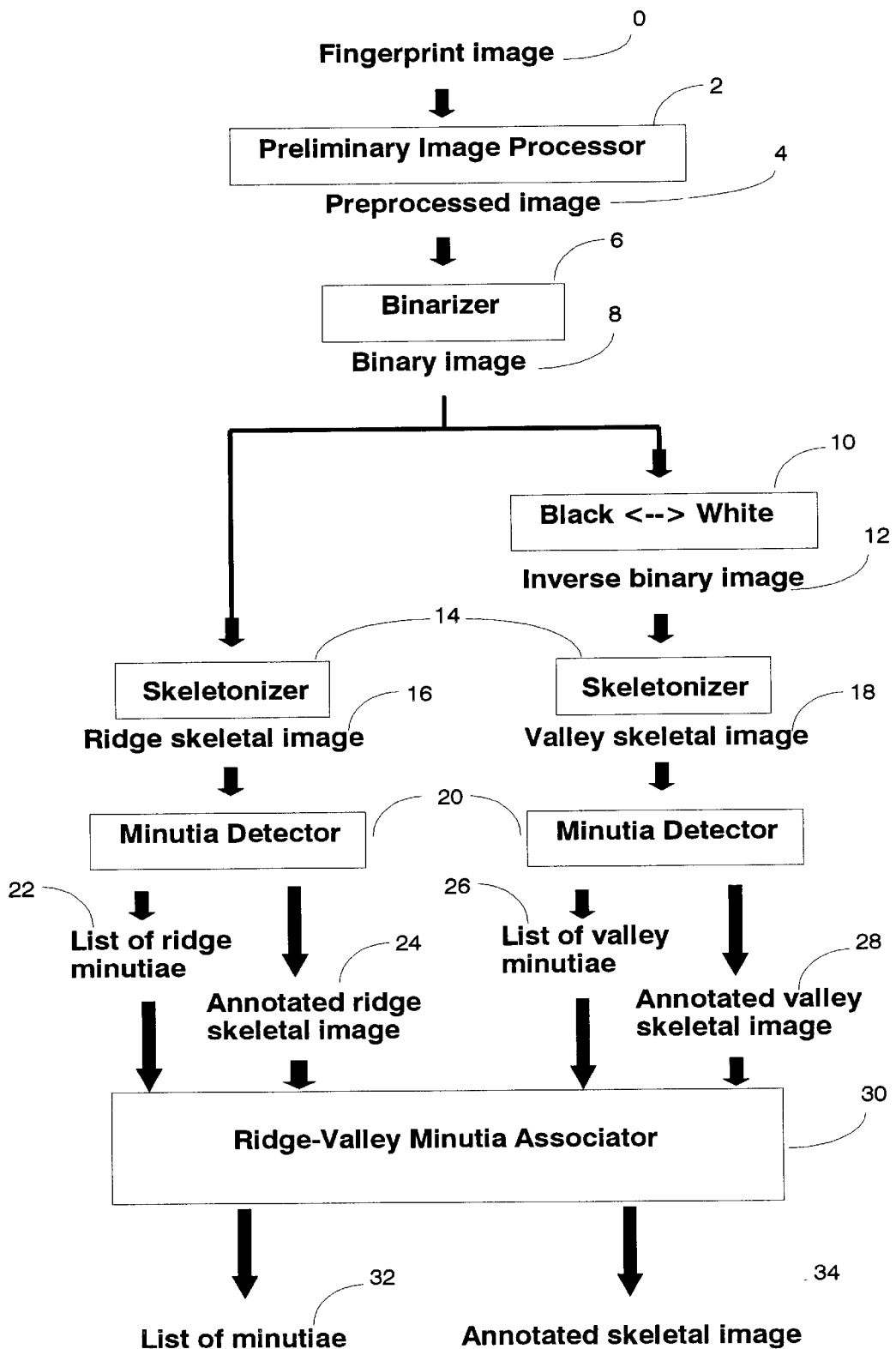
FIG. 1 is a block diagram showing an overall view of the processing sequence leading to the identification of minutiae.

FIG. 1 shows an overall view of the processing sequence leading to the identification of minutiae. Much shown here is common in the art, so FIG. 1 depicts some general themes that can be treated summarily.

Fingerprint image 0 is a grey-level image, acquired by a digital scanning device, and presented to Preliminary Image Processor 2, which performs directional smoothing, filtration and contrast enhancement of the image. The result is a Preprocessed image 4 that presumably has smaller local variations in image intensity and is clearer than the original image 0.

Binarizer 6 then turns all dark pixels black and all light pixels white, to produce a Binary image 8 where the ridges are thick and black. FIG. 2 shows an example (on the left side) of a portion of such an image.

The Binary image 8 is now put through Block 10 of FIG. 1, wherein all black pixels become white and all white pixels become black, to produce the Inverse binary image 12. Block 10 makes explicit the divergence of processing between ridge and valley in this preferred embodiment. FIG. 2 shows an example of a portion of the Binary image 8 and its corresponding Inverse binary image 12.

Both the Binary image 8 and the Inverse binary image 12 then separately are put through Skeletonizer 14, which thins the binary image to produce the Ridge skeletal image 16 and the Valley skeletal image 18, respectively. Each image is still populated by white and black values, but the thick black ridges (or valleys) now have become as thin as possible. The ridges (and valleys) are represented by one pixel-thick strings of black on a white background, as best as can be constructed within the constraints of the square tile arrangement of all pixels.

Within the Ridge 16 and Valley 18 skeletal images single thin strings of black pixels terminate in "morphological events", each of which corresponds to a candidate minutia. An ending is where a string of black pixels simply stops. A bifurcation is where a string of black pixels divides into two separate strings. Several different pixel arrangements are possible in the immediate vicinity of bifurcations. Other more complicated pixel arrangements may be due to unclear parts of the original image 0 or to parts of the Binary image 8 (or its Inverse 12) that reveal some anomaly of the Skeletonizer 14. Connectivity in the Skeletal images 16 and 18 therefore may be inappropriately complex in places.

Minutia Detector 20 identifies those locations on the Ridge 16 or Valley 18 skeletal images that are morphological events. The processor maintains a list of these events, the List of ridge 22 or valley 26 minutiae, respectively. The processor also annotates the input Ridge 16 or Valley 18 skeletal image to produce the Annotated ridge 24 or valley 28 skeletal image, respectively. Upon finding a morphological event the processor annotates the Skeletal image by changing the pixel value from black to some coded value that distinguishes it from black and white values and from the annotations of other types of events. If the pixels of the skeletal image are represented each as an unsigned byte, where black is coded as 0 and white coded as 255, then a code for these events may be selected as any value in the interval [1, 254].

Minutia Detector 20 undertakes several repair functions in addition to its named purpose. The processor looks for and fixes small breaks and eliminates small islands, spurs and bubbles in the Skeletal image input. As it makes these changes it updates both its output List of minutiae and Annotated skeletal image.

Those skilled in the art will recognize that the two entities, the Lists of minutiae 22 and 26 and the Annotated skeletal images 24 and 28, are different formats of much the same information. They are somewhat redundant in that the List is always derivable from the Image. Either format alone is sufficient to support the processing of the Minutia Detector 20 and for subsequent parts of the invention. In this preferred embodiment we maintain both formats and carefully enforce adherence between the two.

Processing like that of Minutia Detector 20, when applied to the Ridge skeletal image 16 alone or even the Valley skeletal image 18 alone, is known in the art.

Figure 3:
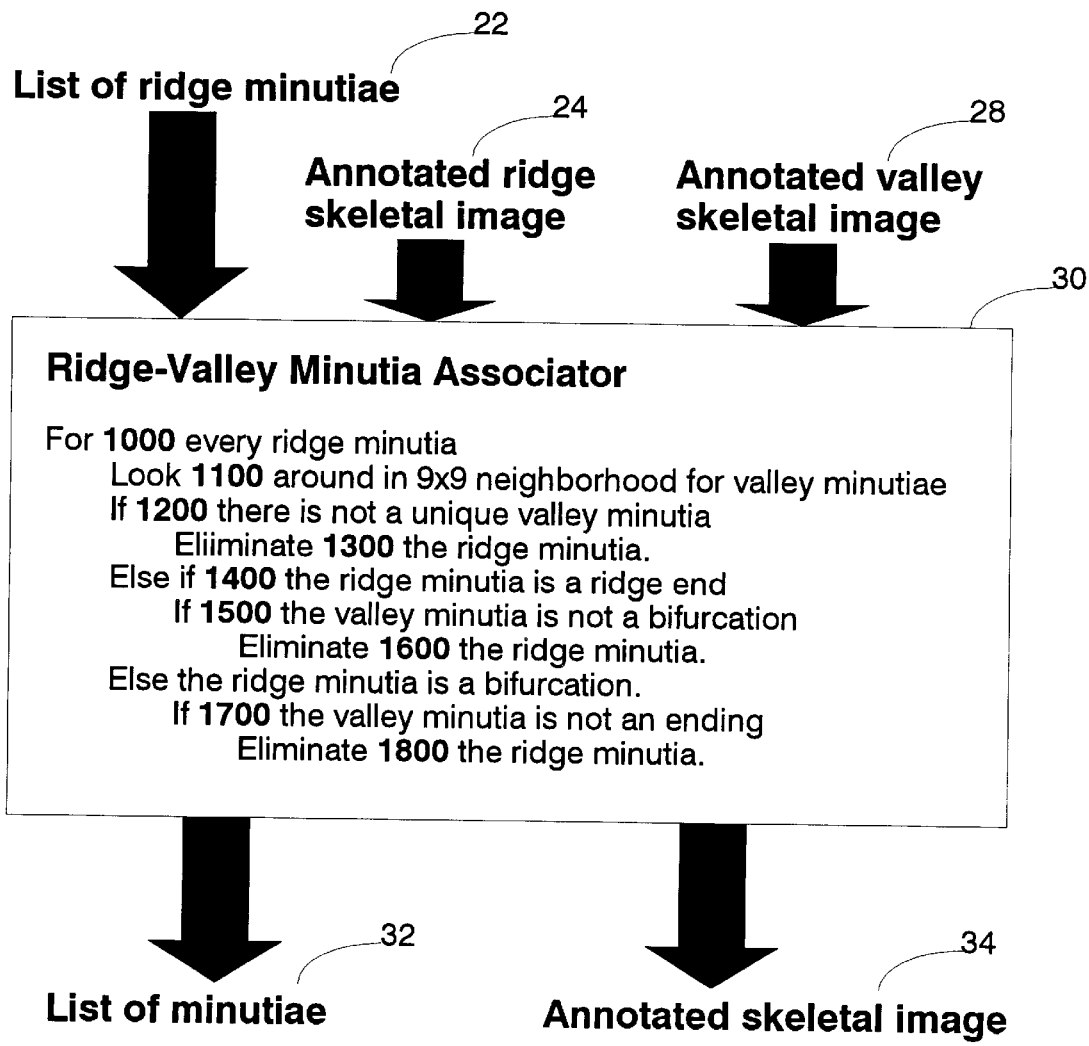
FIG. 3 is a block diagram showing in detail Block 30 of FIG. 1, this being the Ridge-Valley Minutia Associator.

Following the completion of Minutia Detector 20, FIG. 1 shows that the List of ridge minutiae 22 is input to the Ridge-Valley Minutia Associator 30, shown in FIG. 3, as are the Annotated ridge 24 and valley 28 skeletal images. We seek to validate the ridge minutiae by associating each one with a unique valley minutia. We need not use the List of valley minutiae 26. Those skilled in the art will recognize that other combinations of List and Image may be used here, just so one entity is from the ridge side of the processing and another entity is from the valley side.

Passing through the Ridge-valley Minutia Associator 30, the List of ridge minutiae 22 becomes (or simply is renamed to) the List of minutiae 32. Likewise the Annotated ridge skeletal image 24 becomes the Annotated skeletal image 34.

Hence, inside a loop 1000 over all the ridge minutiae, we look 1100 on the Annotated valley skeletal image 192 in a small window centered on coordinates of the ridge minutia. If 1200 there is not a unique valley minutia in this window then we eliminate 1300 the ridge minutia from the List 22. Otherwise, if 1400 the ridge minutia is a ridge end but 1500 the unique valley minutia is not a bifurcation, then we again eliminate 1600 the ridge minutia. Otherwise the ridge minutia must be a bifurcation, and if 1700 the unique valley minutia is not an ending then we again eliminate 1800 the ridge minutia. In the List of ridge minutiae 22, candidate minutia entries are removed. In the Annotated skeletal image 34, minutia pixels that are to be eliminated are turned black.

The Ridge-Valley Minutia Associator 30 obtains an association between ridge and valley minutiae that are of opposite type (ending or bifurcation) and are in close geometrical proximity. This proximity may include angular tolerances of minutia orientations as well as radial distance across the image. Or the proximity may include the fact that an ending is oriented roughly opposite to the orientation of the apparent stem of the candidate associating bifurcation, or that an ending is situated roughly between the apparent left and right branches of the candidate associating bifurcation. The present invention would include any that where failure of any or a combination of such rules would lead to an elimination of minutiae as "false".

Those skilled in the art may recognize also that a ridge bifurcation may be validated by a valley bifurcation under very special circumstances. Suppose Binary image 8 shows an obvious ridge bifurcation, and one of the left or right branches of the bifurcation is very thin close to the minutia. Suppose the section of thin ridge is represented by two eight-connected black pixels, that is, connected at their corners instead of at their edges. Then there will be also two eight-connected white pixels whose corner connection is orthogonal to that of the black pixels. Skeletonizer 14, when applied to the Binary image 8 will of course preserve the connectivity of the branch through this thin section. But the Skeletonizer 14 also will preserve the orthogonal connectivity of pixels in the Inverse binary image 12. Hence, instead of a string of valley pixels' stopping in the "Y" of the ridge bifurcation, it may well proceed through the branch, probably to a valley bifurcation sitting next to the ridge bifurcation. The configuration might look like "YY", except that the right branch of the left (perhaps ridge) "Y" crosses the left branch of the right (perhaps valley) "Y". While we do not choose to accept this situation as validating the ridge bifurcation in this preferred embodiment, associations of this nature could be formulated as rules in similar embodiments governing the rejection of minutiae. Again, the present invention would include any that where failure of any or a combination of such rules would lead to an elimination of minutiae as "false".

Those not necessarily skilled in the art will recognize that valley minutiae could be validated by the close proximity of ridge minutiae, instead of the other way around. This could form the basis of yet another embodiment of the present invention.

While the invention has been described in its preferred exemplary embodiment, it is to be understood that the words which have been used are words of description rather than limitation, and that changes may be made within the purview of the appended claims without departing from the true scope and spirit of the invention in its broader aspects.

We claim:

1. A fingerprint image processing device comprising:

fingerprint image acquisition means, to scan a fingerprint or fingerprint image and to produce a digital image thereof;

ridge skeletonization means, responsive to fingerprint image acquisition means, to produce a thinned representation of ridge morphology;

valley skeletonization means, responsive to fingerprint image acquisition means, to produce a thinned representation of valley morphology interposed between the ridges of the fingerprint;

ridge minutia identification means, responsive to ridge skeletonization means, to identify a plurality of candidate minutiae on the ridges of the fingerprint;

valley minutia identification means, responsive to valley skeletonization means, to identify a plurality of candidate minutiae on the valleys of the fingerprint; and ridge-valley minutia association device, responsive to ridge minutia identification means and to valley minutia identification means, wherein each of a plurality of candidate ridge minutiae are validated or not by the presence of a valley minutia in close geometrical proximity.

2. A fingerprint image processing device comprising:

fingerprint image acquisition means, to scan a fingerprint or fingerprint image and to produce a digital image thereof;

ridge skeletonization means, responsive to fingerprint image acquisition means, to produce a thinned representation of ridge morphology;

valley skeletonization means, responsive to fingerprint image acquisition means, to produce a thinned representation of valley morphology interposed between the ridges of the fingerprint;

ridge minutia identification means, responsive to ridge skeletonization means, to identify a plurality of candidate minutiae on the ridges of the fingerprint;

valley minutia identification means, responsive to valley skeletonization means, to identify a plurality of candidate minutiae on the valleys of the fingerprint; and valley-ridge minutia association device, responsive to ridge minutia identification means and to valley minutia identification means, wherein each of a plurality of candidate valley minutiae are validated or not by the presence of a ridge minutia in close geometrical proximity.

* * * * *